(12) United States Patent
Kalsbeek et al.

(10) Patent No.: US 8,273,134 B2
(45) Date of Patent: Sep. 25, 2012

(54) METHOD FOR SPINNING AND WASHING ARAMID FIBER AND RECOVERING SULFURIC ACID

(75) Inventors: Esther Christina Kalsbeek, Beilen (NL); Wessel Joseph Bruining, Exloo (NL)

(73) Assignee: Teijin Aramid B.V., Arnhem (NL)

( * ) Notice: Subject to any disclaimer, the term of this patent is extended or adjusted under 35 U.S.C. 154(b) by 0 days.

(21) Appl. No.: 12/739,643

(22) PCT Filed: Oct. 10, 2008

(86) PCT No.: PCT/EP2008/063576
§ 371 (c)(1),
(2), (4) Date: Apr. 23, 2010

(87) PCT Pub. No.: WO2009/053254
PCT Pub. Date: Apr. 30, 2009

(65) Prior Publication Data
US 2010/0319139 A1     Dec. 23, 2010

(30) Foreign Application Priority Data
Oct. 23, 2007 (EP) ................ 07020662

(51) Int. Cl.
*D01H 7/00* (2006.01)
*D01F 9/30* (2006.01)
(52) U.S. Cl. ......... 8/115.54; 57/295; 8/489; 442/168; 442/169
(58) Field of Classification Search ........... 442/169, 442/168
See application file for complete search history.

(56) References Cited

U.S. PATENT DOCUMENTS

| | | | |
|---|---|---|---|
| 3,279,225 A * | 10/1966 | Knudsen | 68/181 R |
| 3,856,673 A * | 12/1974 | De La Mater et al. | 210/750 |
| 4,162,346 A * | 7/1979 | Jones et al. | 428/364 |
| 4,409,064 A * | 10/1983 | Vora et al. | 159/47.1 |

(Continued)

FOREIGN PATENT DOCUMENTS
EP    0 021 484 A1    1/1981
(Continued)

OTHER PUBLICATIONS

English abstract of JP 61041312 A, published in Derwent Acc-No: 1986-096983, inventor Nishizawa.*

(Continued)

*Primary Examiner* — Harold Pyon
*Assistant Examiner* — Katie L Hammer
(74) *Attorney, Agent, or Firm* — Oliff & Berridge, PLC

(57) ABSTRACT

A method for spinning and washing aramid fiber and for recovering sulfuric acid by (a) spinning an aramid polymer from a sulfuric acid spin dope to a yarn and coagulating the yarn in a coagulation bath having an inlet for water or diluted sulfuric acid and an outlet for sulfuric acid enriched water; (b) washing the yarn with water to obtain a washed yarn and a washing water containing sulfuric acid; (c) recycling the sulfuric acid enriched water and optionally the washing water to a sulfuric acid recovery unit; (d) increasing the sulfuric acid content of the recycled sulfuric acid enriched water, and optionally the washing water, by evaporation to obtain 20 to 98% sulfuric acid and water; (e) mixing the 20 to 98% sulfuric acid with oleum to obtain 98-105% sulfuric acid; and (f) recycling the 98-105% sulfuric acid to the spinning unit for use as sulfuric acid spin dope.

17 Claims, 4 Drawing Sheets

U.S. PATENT DOCUMENTS 4,702,876 A * 10/1987 Ebregt et al. .................. 264/184
5,603,839 A * 2/1997 Cameron ...................... 210/665

FOREIGN PATENT DOCUMENTS

| EP | 0 168 879 A1 | | 1/1986 |
| JP | 61-41312 A | | 4/1984 |
| JP | 61041312 A | * | 2/1986 |
| WO | WO 2007/004848 A1 | | 1/2007 |
| WO | WO 2007004848 A1 | * | 1/2007 |

OTHER PUBLICATIONS

International Search Report for International Application No. PCT/EP2008/063576 mailed Jun. 29, 2009.

English-language translation of JP 61-41312 A.

* cited by examiner

METHOD FOR SPINNING AND WASHING ARAMID FIBER AND RECOVERING SULFURIC ACID

BACKGROUND

The invention pertains to a method for spinning and washing aramid fiber and for recovering sulfuric acid, using a spinning unit and a sulfuric acid recovery unit.

Aramid fiber is normally produced by dissolving PPTA (para-phenylene terephthal-amide) polymer in 100% sulfuric acid after which the resulting spin dope is expelled through a spinneret. Sulfuric acid is then removed from the fibers in a washing step using water, resulting in a diluted solution of approximately 10-15% $H_2SO_4$.

The diluted sulfuric acid solution can be neutralized and disregarded, resulting in a considerable emission of sulfates and the use of considerable amounts of sulfuric acid and water from an external source. Therefore, it is more convenient to recycle it. For instance, it can be concentrated to 96% $H_2SO_4$ in a series of different distillation processes. Such process, however, is energy consuming and may cause a considerable stream of effluents. Water is evaporated from the sulfuric acid solution in the process, requiring considerable amounts of energy. Moreover, the distilled water contains trace amounts of sulfuric acid making it unsuitable for use as common water. It is therefore an objective to device a method for recovery and recycling sulfuric acid obtained during the spin process of aramid that uses low amounts of energy and can be performed in a closed system.

SUMMARY

To this end the invention relates to a method for spinning and washing aramid fiber and for recovering sulfuric acid, using a spinning unit and a sulfuric acid recovery unit, comprising the steps:
a) spinning an aramid polymer from a sulfuric acid spin dope to a yarn and coagulating the yarn in a coagulation bath having an inlet for water or diluted sulfuric acid and an outlet for sulfuric acid enriched water;
b) washing the yarn with water to obtain washed yarn and washing water containing 0.5-20 wt. % sulfuric acid;
c) recycling the sulfuric acid enriched water and optionally the washing water to the sulfuric acid recovery unit;
d) increasing the sulfuric acid content of the recycled sulfuric acid enriched water, and optionally the washing water, by evaporation to obtain 20 to 98% sulfuric acid and water;
e) mixing the 20 to 98% sulfuric acid with oleum to obtain 98-105% sulfuric acid;
f) recycling the 98-105% sulfuric acid to the spinning unit for use as sulfuric acid spin dope.

BRIEF DESCRIPTION OF DRAWINGS

An installation for performing the method is shown in the following Figures.

DETAILED DESCRIPTION

According to this invention the evaporated water can be recycled for use as water in the washing step of the spinning process, thereby further eliminating the emission of sulfates. In a preferred embodiment the yarn is washed with water in counter current operation. The water may contain minor amounts of acid, base or salt, particularly low amounts of sulfuric acid, for instance 0.05 to 0.5 wt %.

Oleum from an external source is used to concentrate sulfuric acid, for instance from 96% $H_2SO_4$ to 100% $H_2SO_4$. As a result an excess of 20 to 98% (preferably about 96%) $H_2SO_4$ is produced in the concentration process. The excess can be removed from the process and can be used as a purge for both the sulfuric acid and the water recycle, preventing the buildup of trace elements.

During the concentration to 20-98% $H_2SO_4$, preferably to about 96%, organic components in the acid are decomposed by oxidation with hydrogen peroxide. The resulting $H_2SO_4$ is re-used by mixing with oleum to obtain 98-105%, preferably about 100% $H_2SO_4$. This process is virtually without any loss of water and sulfuric acid, and the sulfuric acid obtained is recycled to the spinning unit for use as the spin dope. Because oleum is introduced into the acid recycle an excess $H_2SO_4$ is produced, which excess can be sold or used for other processes.

The condensate as obtained in the various evaporation processes is collected and re-used as washing water in the spinning process.

To minimize energy consumption in all evaporation processes heat integration is used, i.e. the feed is heated and the effluents are cooled by exchanging heat.

Figure 1:
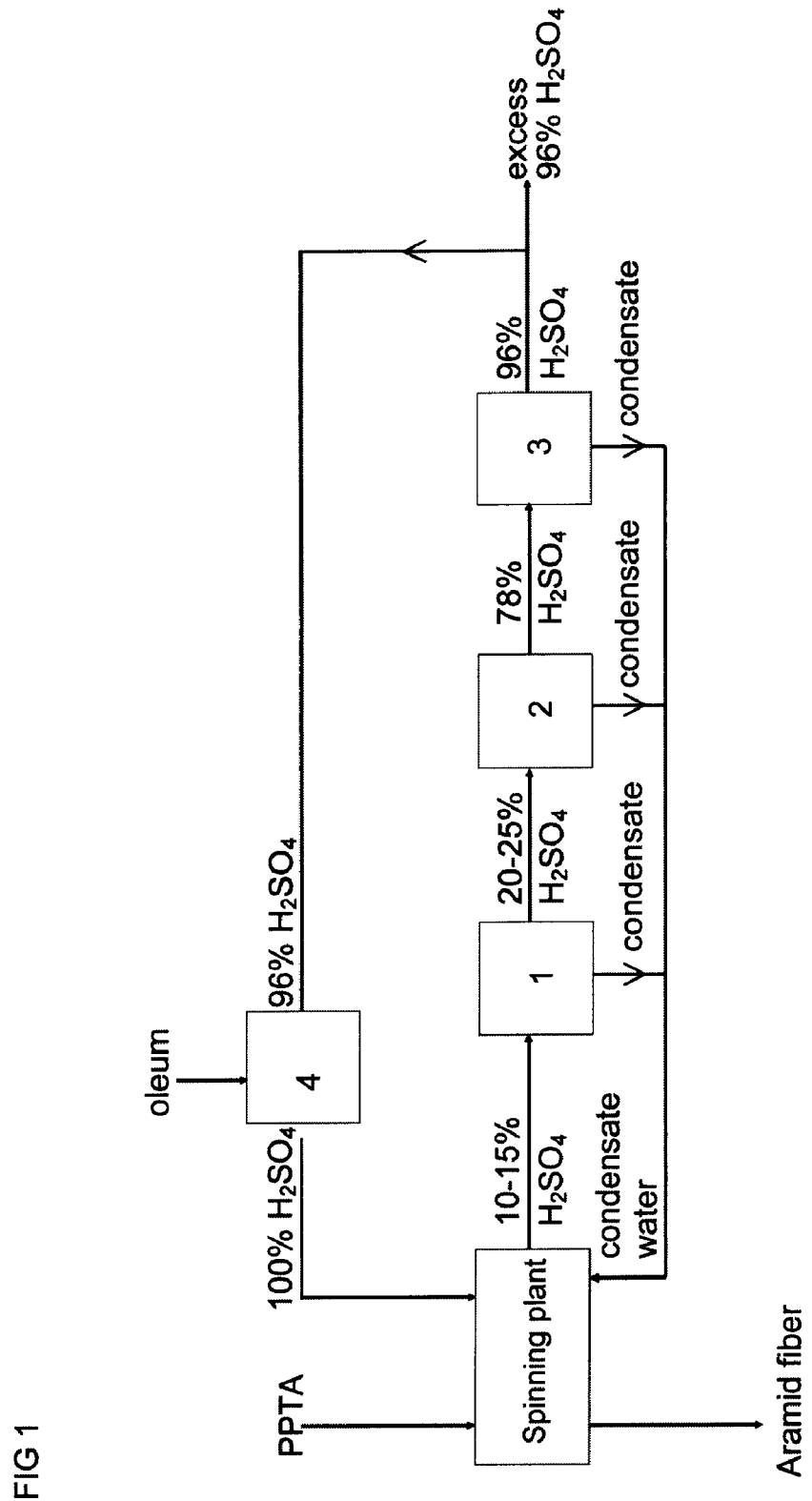
FIG. 1 shows a block diagram of an acid and condensate recycle.
Figure 2:
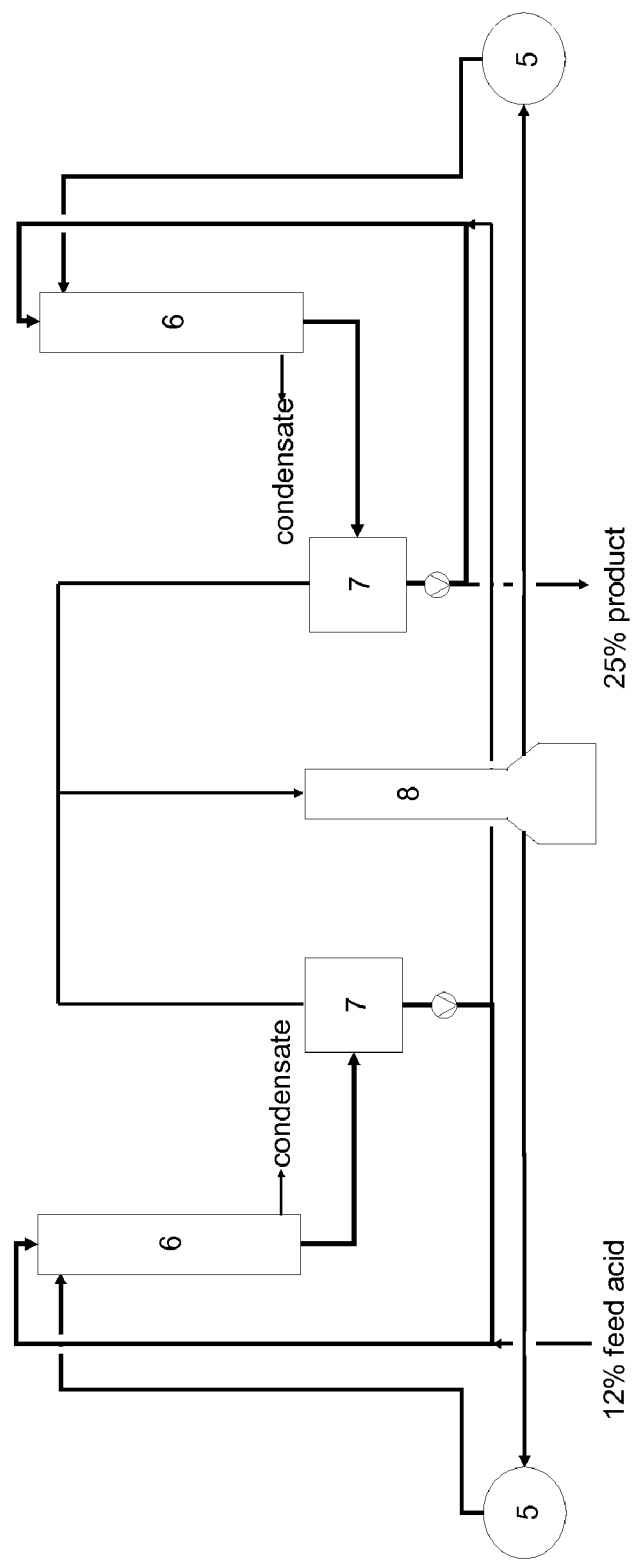
FIG. 2 shows a block diagram of a two-stage mechanical vapor recompression process.

FIG. 1 shows a block diagram of the whole process comprising the spinning plant giving diluted sulfuric acid which is concentrated in three separated evaporation steps 1, 2, and 3 rendering for instance 96% sulfuric acid, the majority of which is further concentrated in step 4 by adding oleum and which is thereafter recycled to the spinning plant, wherein the excess of sulfuric acid is removed from the process. The block diagram shows the following elements:
1=pre-concentration step to 20-25% $H_2SO_4$ using MVR technology.
2=multi-effect evaporator step to 78% $H_2SO_4$.
3=two-stage evaporator step to 96% $H_2SO_4$.
4=100% $H_2SO_4$ preparation using oleum In FIG. 2 in the first evaporation step 10-15% sulfuric acid solution is concentrated to 20-25% $H_2SO_4$ using a two-stage mechanical vapor recompression (MVR) process. This step is optional but the acid concentration process is more energy efficient with this step. In this step the feed is evaporated by a falling film separator 6 and an evaporator 7 giving partly product that via a scrubber 8 is further transported in the process using blowers 5 and partly product that is again led through a falling film heat exchanger 6 and an evaporator 7.

Figure 3:
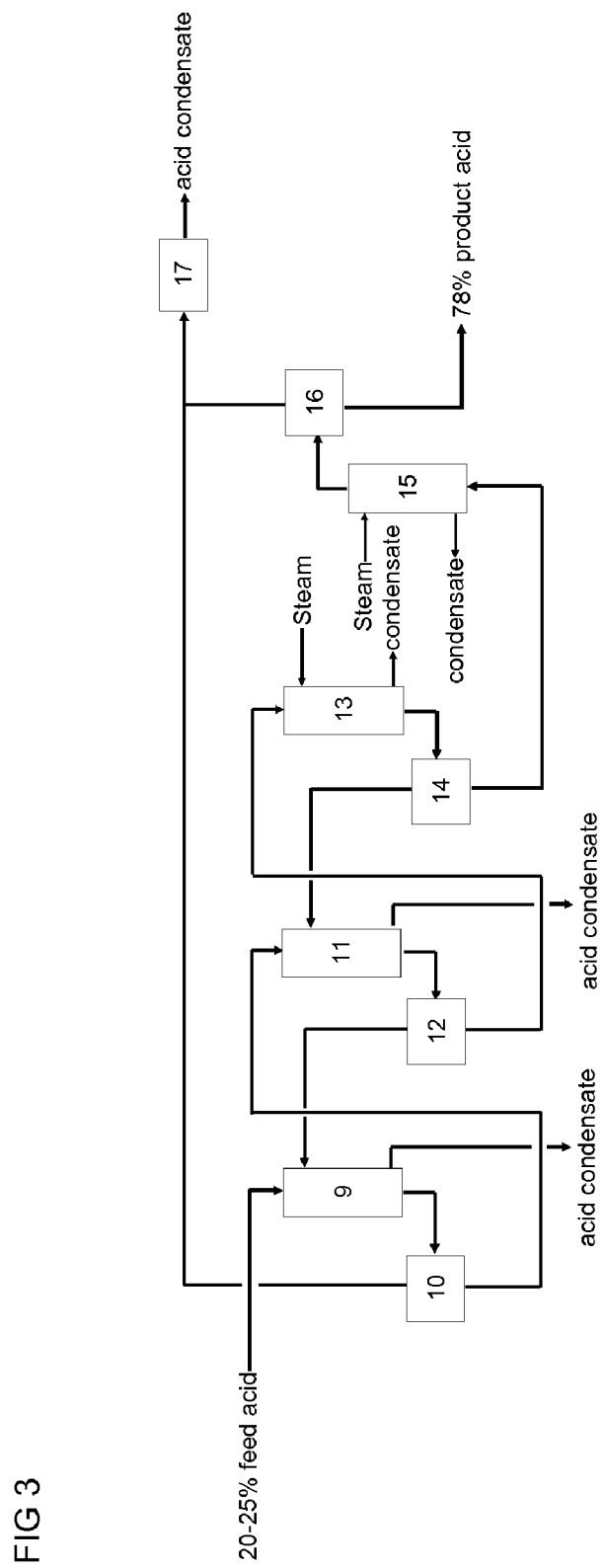
FIG. 3 shows a block diagram of a triple-stage evaporator followed by single-stage evaporation step.
Figure 4:
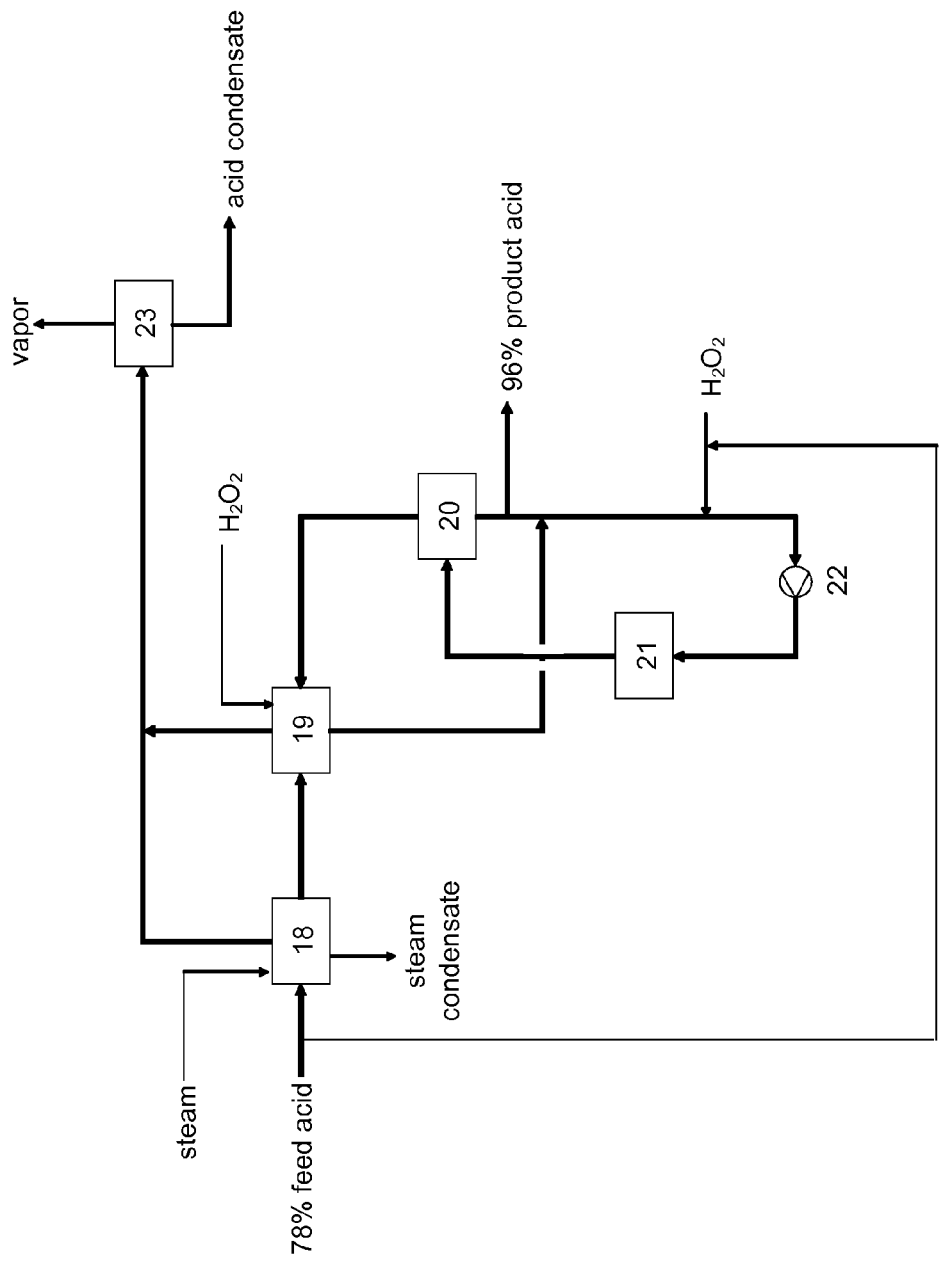
FIG. 4 shows a block diagram of a two-stage evaporator process.

The block diagram shows the following elements:
5=a blower for compressing vapors from the evaporation stage
6=a heat exchanger
7=an evaporator vessel
8=a scrubber In FIG. 3 the sulfuric acid solution is concentrated in an evaporation unit for a second evaporation step to 78% $H_2SO_4$ using a triple-stage evaporation where the sulfuric acid is concentrated to 55-65% $H_2SO_4$, followed by a single evaporation stage to obtain 78% $H_2SO_4$. The block diagram shows the following elements:
9=first stage graphite falling film evaporator
10=first stage lined evaporator
11=second stage graphite falling film
12=second stage lined evaporator vessel 13=third stage graphite falling film evaporator
14=third stage evaporator vessel
15=fourth stage falling film evaporator
16=fourth stage evaporator vessel
17=mixing condenser In FIG. 4 the sulfuric acid is concentrated to 96% $H_2SO_4$ using a two-stage evaporation process. In this final step hydrogen peroxide is added to the hot sulfuric acid circulation to decompose organic components present in the acid by oxidation. Before the addition the $H_2O_2$ is mixed with part of the 78% sulfuric acid to allow for a larger amount of $H_2O_2$ to be added, increasing the conversion of organic components. The 78% feed acid is preheated and led through the first evaporator vessel 18, which has an inserted heater, where the acid is concentrated to approximately 85% $H_2SO_4$. The 85% acid is led through a washing column 19 where it is used to wash the vapor coming from the second evaporation stage to remove as much as $H_2SO_4$ as possible from the vapor phase. In this column hydrogen peroxide is also added to oxidize $SO_2$ formed in the second evaporation stage to $SO_3$, which is converted to $H_2SO_4$ by water present in the acid solution.

The liquid 85% acid coming from the washing column is fed to the second evaporation stage, where the acid is concentrated to 96% $H_2SO_4$.

The block diagram shows the following elements:
18=first stage evaporator vessel, preferably having a heat exchanger
19=washing column
20=second stage evaporator vessel
21=second stage heaters
22=circulation pump
23=spray-off column

The invention claimed is:

1. A method for spinning and washing aramid fiber and for recovering sulfuric acid comprising:
   a) spinning an aramid polymer from an aramid polymer and sulfuric acid spin dope by expelling the spin dope through a spinneret to obtain an expelled spin dope, coagulating the expelled spin dope with water or diluted sulfuric acid by transporting the expelled spin dope through a coagulation bath containing water or diluted sulfuric acid to obtain a coagulated yarn in a coagulation bath having an inlet for water or diluted sulfuric acid and an outlet for sulfuric acid enriched water;
   b) washing the coagulated yarn with water to obtain a washed yarn and a washing water containing sulfuric acid;
   c) recycling the sulfuric acid enriched water to a sulfuric acid recovery unit;
   d) increasing the sulfuric acid content of the recycled sulfuric acid enriched water by evaporation to obtain evaporated sulfuric acid consisting of 20 to 98% sulfuric acid and water;
   e) mixing the 20 to 98% sulfuric acid obtained in step d) with oleum to obtain 98-105% sulfuric acid; and
   f) recycling the 98-105% sulfuric acid to a spinning unit for inclusion as at least a portion of the sulfuric acid spin dope.

2. The method according to claim 1, wherein in step b) the yarn is washed with water in counter-current operation.

3. The method according to claim 1, wherein the washing water containing sulfuric acid obtained in step b) is recycled to the inlet of the coagulation bath as the diluted sulfuric acid.

4. The method according to claim 3, wherein the washing water containing sulfuric acid obtained in step b) is completely recycled to the inlet of the coagulation bath.

5. The method according to claim 1, wherein the water obtained in d) is recycled to the spinning unit for use as water for washing the yarn.

6. The method according to claim 1, wherein the sulfuric acid content of the sulfuric acid enriched water is increased in step d) in at least two distinct evaporation steps.

7. The method according to claim 6, wherein the recycled sulfuric acid enriched water contains 5-20% sulfuric acid, which in a first phase is evaporated to obtain 16-24% sulfuric acid, which in a second phase is evaporated to obtain 72-82% sulfuric acid and which in a third phase is evaporated to obtain 94-98% sulfuric acid.

8. The method according to claim 1, wherein during or after step d) and before step e), the sulfuric acid is treated with hydrogen peroxide to decompose organic contaminants and/or to oxidize sulfur dioxide to sulfur trioxide.

9. The method according to claim 8, wherein the sulfuric acid content is increased in three distinct evaporation steps and the sulfuric acid is treated with part of the hydrogen peroxide during the third evaporation step, and wherein the vapor obtained in the third evaporation step is treated with another part of the hydrogen peroxide prior to condensation and recycling to the spinning unit.

10. The method according to claim 1, wherein the sulfuric acid content is increased in step d) in at least three distinct evaporation steps.

11. The method according to claim 1, wherein the sulfuric acid enriched water and the washing water containing sulfuric acid are combined prior to step d).

12. The method according to claim 1, wherein the yarn is washed with water comprising the recycled water from the sulfuric acid recovery unit.

13. The method according to claim 1, wherein the coagulation bath comprises the recycled water from the sulfuric acid recovery unit.

14. The method according to claim 1, wherein the water from step b) contains 0.5 to 20 weight % sulfuric acid.

15. The method according to claim 1, wherein in step c) further comprises recycling the washing water containing sulfuric acid to the sulfuric acid recovery unit along with the sulfuric acid enriched water.

16. The method according to claim 15, wherein step d) further comprises that the sulfuric acid content of the washing water containing sulfuric acid and the recycled sulfuric acid enriched water is increased by evaporation to obtain evaporated sulfuric acid comprised of 20 to 98% sulfuric acid and water.

17. The method according to claim 1, wherein a part of the washing water containing sulfuric acid is recycled to the inlet of the coagulation bath as the diluted sulfuric acid and a remainder of the washing water containing sulfuric acid is recycled to the sulfuric acid recovery unit.

* * * * *